United States Patent [19]
Bishov et al.

[11] 3,852,502
[45] Dec. 3, 1974

[54] THE METHOD OF STABILIZING FOODS WITH AN ANTIOXIDANT

[75] Inventors: Solomon J. Bishov; Albert S. Henick, both of Framingham, Mass.

[73] Assignee: The United States of America as represented by the Secretary of the Army, Washington, D.C.

[22] Filed: Apr. 9, 1973

[21] Appl. No.: 349,588

[52] U.S. Cl................ 426/328, 426/179, 426/183, 426/228
[51] Int. Cl............................................. A23l 3/34
[58] Field of Search ....... 426/228, 62, 72, 181, 183, 426/328, 204; 252/404

[56] References Cited
UNITED STATES PATENTS

| | | | |
|---|---|---|---|
| 2,928,740 | 3/1960 | Rosenthal et al. | 426/62 |
| 3,278,308 | 10/1966 | Marco | 426/228 |
| 3,448,010 | 6/1969 | Pomper et al. | 426/62 |
| 3,637,772 | 1/1972 | Klaui et al. | 426/228 |

*Primary Examiner*—A. Louis Monacell
*Assistant Examiner*—Curtis P. Ribando
*Attorney, Agent, or Firm*—Eugene E. Stevens; Charles C. Rainey; Lawrence E. Labadini

[57] ABSTRACT

A synergistic antioxidant composition comprising a phenolic-type antioxidant and a degraded protein, and a method of stabilizing food products against oxidation therewith. BHA, BHT, and α-tocopherol are particularly suitable phenolic-type antioxidants for use in such compositions. Autolyzed yeast or hydrolyzed vegetable protein are particularly effective degraded proteins for such use in compositions for protecting food products, permitting marked reductions in the concentrations of the phenolic-type antioxidants.

2 Claims, No Drawings

THE METHOD OF STABILIZING FOODS WITH AN ANTIOXIDANT

The invention described herein may be manufactured, used, and licensed by or for the Government for governmental purposes without the payment to us of any royalty thereon.

BACKGROUND OF THE INVENTION

This invention relates to synergistic antioxidant compositions and to a method of stabilizing food materials therewith. More particularly, the invention relates to reducing the concentration of well-known and widely used synthetic or naturally occurring phenolic-type antioxidants by the employment in conjunction therewith of a synergistic antioxidant material derived from natural proteinaceous materials.

It has been customary in the processing of a great many foods, which are to be stored for a fairly long period of time between their manufacture and their ultimate consumption, to add small quantities of antioxidants to the foods during their manufacture, or in some cases to take advantage of naturally occurring antioxidants contained in one or more of the ingredients used in the manufacture of the foods. Among the more frequently employed antioxidants for this purpose are members of the phenolic group of anti-oxidants, some of the more efficient of which are synthetic. BHA and BHT are two of the more often antioxidants of this type. Although they are synthetic, their use is permitted by the Food and Drug Administration provided their concentrations in foods do not exceed certain values. The tocopherols, especially α-tocopherol, have also been permitted in foods. These antioxidants occur naturally in a number of food materials, notably vegetable oils. However, in general, the latter antioxidants are not as effective as BHA, so that this antioxidant material has come to be probably the most highly favored antioxidant for stabilizing food products against oxidation.

In recent years, much concern has developed with regard to the use of synthetic materials in foods, perhaps more from the standpoint of the possibility that synthetic materials in contrast to naturally occurring materials may be more conducive to abnormalities in growth and development of human beings, or of animals which are used as sources of food products. Whatever the reason for the concern, it appears desirable insofar as possible to reduce the concentrations of such antioxidants as the phenolics, such as BHA or BHT, or even of such naturally occurring antioxidants as the tocopherols, as much as possible while still adequately protecting food products against oxidation since the latter type of reaction develops off-flavors and off-odors and may, in certain cases, result in the formation of products in foods which may have toxic or allergic or other undesirable properties. In any event, such oxidation products usually make foods less and less acceptable as their concentrations increase.

It is, therefore, an object of the present invention to provide an antioxidant composition comprising a phenolic-type antioxidant, the antioxidant action of which is synergized by means of a composition derived from naturally occurring food materials so that the concentration of the phenolic-type antioxidant may be reduced below that which is normally required for good antioxidant effect and stabilization of a food product in the absence of such a synergistic composition.

A further object of the invention is to provide a method of stabilizing a food product intended for human or animal consumption against oxidation thereof involving the use with the food material of an antioxidant composition comprising a synergistic mixture of a phenolic-type antioxidant with a synergist derived from a naturally occurring food material.

Other objects of the invention will become apparent from the following description, and the novel features will be particularly pointed out hereinafter in connection with the appended claims.

SUMMARY

The objects of the invention are accomplished by combining a protein derivative material prepared from yeast by autolysis thereof or from a plant or vegetable protein, such as soy bean protein, by acid hydrolysis thereof, with a phenolic-type antioxidant and incorporating such a combination in a food product which, in the absence of the antioxidant composition, would be subject to rapid oxidation in the presence of air. In general, because of the synergistic action of the protein derivative material, it is not necessary to employ nearly so high a concentration of the phenolic-type antioxidant in the food product as when there is substantially no added protein derivative, particularly of the autolyzed yeast protein type or the hydrolyzed vegetable protein type, present in the food.

Autolyzed yeast proteins and hydrolyzed vegetable proteins have proven very useful in the development of special flavors simulating meat flavors of various types as well as other desirable flavors. Since these protein derivatives are prepared from natural sources which are quite edible and nutritious, there appears to be no reason why they would not be permissible in food products along with small concentrations of antioxidants which have been proven to be effective and which are permitted to be added to foods or to be naturally present in foods in concentrations up to certain legally acceptable concentrations, especially when their presence along with the phenolic-type antioxidant makes possible an appreciable reduction in the concentration of the phenolic-type antioxidant due to the synergistic action of the protein derivative on the phenolic-type antioxidant, without excessive loss of stabilizing effect on the food involved.

Butylated hydroxyanisole (abbreviated herein and generally referred to as BHA) is a mixture of isomers of 4-hydroxyanisole having a tertiary butyl group substituted in the benzene ring at the 2- or 3- position.

Butylated hydroxytoluene (abbreviated herein and generally referred to as BHT) is a mixture of isomers of 4-hydroxytoluene having a tertiary butyl group substituted in the benzene ring at the 2- or 3- position.

Alpha-tocopherol (α-tocopherol) is 5, 7, 8-trimethyltocol which occurs naturally in substantial concentrations in wheat germ oil. It is a phenolic type antioxidant and is also recognized as being Vitamin E or the most important constituent of Vitamin E.

Up to 0.02 percent by weight of BHA is permitted in food products by the Food and Drug Administration. The antioxidant effect of BHA increases as the concentration thereof increases up to 0.02 percent, then levels off for higher concentrations. Approximately 10 percent by weight of autolyzed yeast protein is required to provide substantially the same degree of protection as that produced by 0.02 percent of BHA as determined on an unsaturated type oil freed of tocopherols before such a test. However, when used in combination in a food, about twice as great an effect as that produced by 0.02 percent BHA is obtained with 0.005 percent BHA plus 10 percent autolyzed yeast protein. It is apparent, therefore, that a synergistic effect is obtained when the degraded protein is used in combination with the BHA, thus permitting a substantial (about a four-fold) decrease in the concentration of the BHA required to provide a given degree of antioxidant protection. Similar results have been obtained with hydrolyzed vegetable protein as the degraded protein serving as a synergist for BHA. Quite similar synergistic effects have been found when protein derivative material from autolyzed yeast protein or hydrolyzed vegetable protein has been combined with BHT or α-tocopherol as with BHA.

In general, from about 3 percent to about 10 percent by weight of the protein derivative material is preferably used in combination with either BHA or BHT or α-tocopherol to synergize the antioxidant effect of the BHA or BHT or the α-tocopherol, although other concentrations from about 0.5 percent to about 50 percent by weight may be used, if found desirable, in order to decrease the concentration of the phenolic-type antioxidant used to accomplish protection of food products against oxidation.

In general, the invention is applicable to any concentration of a phenolic-type antioxidant in a food product from about 0.0005 percent up to about 0.05 percent, but normally concentrations of such antioxidants above those approved by the U.S. Food and Drug Administration for use in human foods will not be used.

Throughout the specification and claims the percentages of the antioxidant materials are based on the weight of oxidation-susceptible oil with which the antioxidant material is used.

DESCRIPTION OF THE PREFERRED EMBODIMENT

The invention may be better understood by reference to the following examples, which are for illustrative purposes, and are not intended to limit the scope of the invention.

EXAMPLE I

Autolyzed yeast protein (AYP) in the form of commercial AYP manufactured by Vico-Asmus Products Division, A. E. Staley Manufacturing Co. and hydrolyzed vegetable protein (HVP) in the form of commercial HVP manufactured by Food Ingredients Division, The Nestle Co., Inc. were used, each in combination with BHA in the form of butyl hydroxyanisole manufactured by Distillation Products Industries Division, Eastman Chemical Products, Inc., in an emulsion with tocopherol-free corn oil manufactured by Distillation Products Industries Division, Eastman Chemical Products, Inc. and carboxy-methyl-cellulose (CMC) manufactured by Hercules Manufacturing Co. as an inert matrix, each emulsion being shell frozen and then freeze dehydrated prior to oxidation studies on the freeze-dried mixture to determine the induction period. Individual samples were prepared by adding (in succession) to a blender cup 50 ml water, the antioxidant material (BHA) as required, the synergistic antioxidant material (AYP or HVP) as required, 1 g. CMC, and dropwise with intermittent mixing in a blender 1 g. of tocopherol-free corn oil. Total solids in the emulsion were adjusted to 15 percent. The final mixture was blended for 2 minutes, transferred to a 250 ml round bottom flask, shell frozen, and freeze dehydrated. The freeze dehydrated emulsions were individually ground in a sharp-bladed Waring blender to produce light, fluffy flakes of large surface area and having densities of about 0.1 to 0.2 g per cc. on which the oxidation studies were run. The oxidation of each sample was carried out in a 250 ml round bottom flask under an atmosphere of air at 65.5°C. The flasks were closed with rubber serum stoppers. Oxygen in the headspace was determined periodically by gas chromatography according to the method of the inventors of the present application published in the Journal of the American Oil Chemists Society, Vol. 43, page 477. The induction period (I.P.) was taken as the time (in hours) at which 50 percent of the original oxygen in the headspace had been consumed. Table 1 shows the induction periods for the various samples, the % BHA and % AYP or % HVP being in terms of weight percentage of the tocopherol-free corn oil. The synergism of the combination of BHA and either AYP or HVP is expressed as a percentage, represented by Syn. %, of the observed effect due to synergism, and is calculated from the equation:

$$\text{Syn. \%} = 100\,[(M-C) - (P-C) - (A-C)] / (M-C)$$

in which
 $M =$ the I.P. of the combination of antioxidants
 $P =$ the I.P. of the phenolic (BHA) antioxidant
 $A =$ the I.P. of the autolyzed yeast protein (AYP) or the hydrolyzed vegetable protein (HVP)
 $C =$ the I.P. of the control (no antioxidant)
Each I.P. value represents the average of duplicate determinations. The mean value is the average value for all of the Syn. percent values for a given combination of BHA with either AYP or HVP.

TABLE 1

| % AYP | 0 | 10 | | 25 | | 50 | |
|---|---|---|---|---|---|---|---|
| % BHA | I.P. | I.P. | Syn. % | I.P. | Syn. % | I.P. | Syn. % |
| 0 | 39 | 131 | | 140 | | 200 | |
| 0.005 | 59 | 221 | 38 | 267 | 47 | 326 | 37 |
| 0.010 | 64 | 225 | 46 | 305 | 53 | 370 | 44 |
| 0.020 | 98 | 307 | 44 | 447 | 61 | 498 | 52 |

Mean Syn. % = 47.0

| % HVP | 0 | 10 | | 25 | | 50 | |
|---|---|---|---|---|---|---|---|
| % BHA | I.P. | I.P. | Syn. % | I.P. | Syn. % | I.P. | Syn. % |
| 0 | 14 | 90 | | 123 | | 158 | |
| 0.005 | 42 | 189 | 40 | 275 | 48 | 373 | 52 |
| 0.010 | 96 | 253 | 34 | 333 | 40 | 440 | 47 |
| 0.020 | 116 | 386 | 52 | 458 | 53 | 495 | 49 |

Mean Syn. % = 46.1

EXAMPLE II

α-tocopherol in combination with either AYP or HVP was used to stabilize corn oil from which the naturally occurring tocopherols had been removed in a manner similar to the use of BHA described in Example I. Table 2 shows the induction periods (in hours) for the various samples in which the concentrations of α-tocopherol and AYP or HVP were varied. The synergism of the combinations of antioxidants was calculated in the same manner as in Example I.

TABLE 2

| % AYP | 0 | 10 | | 25 | | 50 | |
|---|---|---|---|---|---|---|---|
| %α-tocopherol | I.P. | I.P. | Syn.% | I.P. | Syn.% | I.P. | Syn.% |
| 0 | 24 | 78 | | 116 | | 132 | |
| 0.02 | 48 | 156 | 41 | 198 | 33 | 200 | 25 |
| 0.04 | 42 | 137 | 36 | 177 | 28 | 236 | 40 |
| 0.06 | 55 | 178 | 45 | 227 | 39 | 254 | 40 |
| 0.08 | 59 | 184 | 44 | 224 | 36 | 240 | 34 |
| | | Mean Syn. % = 37.0 | | | | | |

| % HVP | 0 | 10 | | 25 | | 50 | |
|---|---|---|---|---|---|---|---|
| %α-tocopherol | I.P. | I.P. | Syn.% | I.P. | Syn.% | I.P. | Syn.% |
| 0 | 14 | 90 | | 123 | | 158 | |
| 0.02 | 27 | 160 | 39 | 207 | 37 | 238 | 30 |
| 0.04 | 33 | 195 | 47 | 227 | 40 | 277 | 38 |
| 0.06 | 52 | 237 | 49 | 257 | 40 | 260 | 26 |
| 0.08 | 34 | 162 | 35 | 204 | 32 | 242 | 28 |
| | | Mean Syn. % = 37.0 | | | | | |

EXAMPLE III

Butylated hydroxytoluene (BHT) in combination with either AYP or HVP was used to stabilize tocopherol-free corn oil in a manner similar to the use of BHA described in Example I, except that the concentration ranges of AYP and HVP were decreased. Table 3 shows the induction periods (in hours) for the various samples in which the concentrations of BHT and AYP or HVP were varied. The synergism of the combinations of antioxidants was calculated in the same manner as in Example I.

trated by means of detailed examples in which synergistic antioxidant compositions comprised either BHA or BHT or α-tocopherol as phenolic-type antioxidants and HVP or AYP as protein derivative materials acting as synergists for the phenolic-type antioxidants, it is to be understood that other phenolic-type antioxidants may be used in a similar manner. For example, other tocopherols, of which several are known and which have antioxidant properties, may be similarly used in combinations with HVP or AYP as synergists. Although relatively few of the known antioxidants are approved by the Food and Drug Administration for addition to food products, any such antioxidant materials of the phenolic-type which now or in the future may be approved for use in combination with food products are contemplated as being within the scope of the present invention. It is quite possible that some phenolic-type antioxidant materials which have not been permitted in foods in the past or which have been used for a while and then disapproved because of toxicities or questions of possible carcinogenicity in higher concentrations may as a result of the present invention become useful in foods in combinations with quantities of HVP or AYP

TABLE 3

| % AYP | 0 | 3 | | 5 | | 10 | |
|---|---|---|---|---|---|---|---|
| % BHT | I.P. | I.P. | Syn. % | I.P. | Syn. % | I.P. | Syn. % |
| 0 | 26 | 46 | | 61 | | 77 | |
| 0.005 | 36 | 113 | 65 | 88 | 27 | 109 | 27 |
| 0.010 | 47 | 128 | 60 | 157 | 57 | 123 | 27 |
| 0.020 | 52 | 184 | 71 | 225 | 70 | 187 | 50 |
| | | Mean Syn. % = 50.4 | | | | | |

| % HVP | 0 | 3 | | 5 | | 10 | |
|---|---|---|---|---|---|---|---|
| | I.P. | I.P. | Syn. % | I.P. | Syn. % | I.P. | Syn. % |
| % BHT | | | | | | | |
| 0 | 26 | 56 | | 60 | | 91 | |
| 0.005 | 36 | 78 | 42 | 92 | 49 | 116 | 28 |
| 0.010 | 47 | 113 | 41 | 110 | 35 | 120 | 9 |
| 0.020 | 52 | 182 | 64 | 143 | 49 | 140 | 20 |
| | | Mean Syn. % = 37.4 | | | | | |

Although the invention has been described and illustrated of as much as 50 percent by weight of the oxidation susceptible materials in the product since HVP and AYP are non-toxic and their antioxidant characteristics may be synergized by very small amounts of such phenolic-type antioxidants, amounts thereof which may be so small as to cause no concern about toxicity or other ill effects.

Although the invention has been described above in terms of the use of synergistic amounts of hydrolyzed vegetable protein, particularly hydrolyzed soy bean protein, or autolyzed yeast protein, as the protein derivative material employed in combination with a phenolic-type antioxidant in the stabilization of food products against oxidative degradation, it is to be understood that other sources of protein derivative materials may be employed for producing the synergist to be used in combination with the phenolic-type antioxidant. Different protein degradation or breakdown products will not be equally effective as synergists for phenolic-type antioxidants since the proportions of various hydrolysis or other breakdown products will vary depending on the source of the protein and, furthermore, it is not known which of the various breakdown products of proteins are most responsible for the synergistic action which provides the basis of the present invention. It is, therefore, intended that the expression HVP includes hydrolyzed proteins from any vegetable sources which effectively synergize the antioxidant properties of phenolic-type antioxidants.

The synergistic antioxidant compositions of the invention are very useful for stabilizing food products against oxidation. They make possible considerable reductions in the concentrations of phenolic-type antioxidants in foods, thus markedly reducing the probabilities of harmful effects of such chemical additives on the health and well-being of consumers. In the present state of society, many food products require production long before they are consumed. Hence, they need to be protected against oxidative degradation both for better nutrition and retention of desirable flavors, aromas, textures and the like. The present invention, making possible marked reductions in the amounts of synthetic antioxidants needed in food products to protect them for a reasonable length of time until they are consumed, will result in advantages which are at present incalculable in terms of health preservation as well as food protection and, therefore, of economic savings.

We wish it to be understood that we do not desire to be limited to the exact details described, for obvious modifications will occur to a person skilled in the art.

We claim:

1. A process for the stabilization against oxidation of oxidation susceptible foods, which comprises adding thereto an antioxidative amount of an antioxidant composition comprising (a) a compound selected from the group consisting of butylated hydroxyanisole, butylated hydroxytoluene, and α-tocopherol, and (b) autolyzed yeast protein, said autolyzed yeast protein being present in said antioxidant composition in an amount which is effective as a synergist for the antioxidant action of said compound selected from the group consisting of butylated hydroxyanisole, butylated hydroxytoluene, and α-tocopherol.

2. The process of claim 1, wherein said compound selected from the group consisting of butylated hydroxyanisole, butylated hydroxytoluene, and α-tocopherol is added to said oxidation susceptible food in a concentration of from about 0.0005 percent to about 0.05 percent by weight and said autolyzed yeast protein is added to said oxidation susceptible food in a concentration of from about 0.5 percent to about 50 percent by weight.

* * * * *